United States Patent [19]

Ezaki

[11] 4,355,448
[45] Oct. 26, 1982

[54] TRIM AND PRODUCING METHOD THEREOF

[75] Inventor: Sazo Ezaki, Bisai, Japan

[73] Assignee: Toyoda Gosei Co., Ltd., Nagoya, Japan

[21] Appl. No.: 58,385

[22] Filed: Jul. 17, 1979

[30] Foreign Application Priority Data

Jul. 17, 1978 [JP] Japan ............................. 53-98073[U]
Apr. 30, 1979 [JP] Japan ................................. 54-53618

[51] Int. Cl.³ .......................................... B23P 17/00
[52] U.S. Cl. .......................................... 29/413; 29/527.4; 29/527.2; 225/2; 72/46; 428/31; 428/122; 428/138
[58] Field of Search ................... 29/413, 527.2, 527.4; 49/440, 441, 440, 491; 428/31, 122, 138; 72/46; 225/2, 4

[56] References Cited

U.S. PATENT DOCUMENTS

| 2,290,842 | 7/1942 | Bush | 428/122 X |
| 3,222,769 | 12/1965 | Le Plae | 52/716 |
| 4,188,424 | 2/1980 | Ohno et al. | 52/716 X |

*Primary Examiner*—George F. Lesmes
*Assistant Examiner*—Alexander S. Thomas
*Attorney, Agent, or Firm*—Cushman, Darby & Cushman

[57] ABSTRACT

A channel-shaped trim having a longitudinally extending opening for embracing and clamping an edge flange of a support member and a method for producing such a trim.

The trim is comprised of a core member composed of a band-shaped metal network which covered and finally broken either partially or totally and thereby separated into a plurality of transversely extending strips, blocks, or into a substantially continuous strip extending along a meandering line through the trim.

The method for producing such a trim includes the steps of preparing a band-shaped network with transversely and longitudinally disposed connecting portions and spaces disposed therebetween, covering the network with an elastic or bondable covering material, such as rubber or a synthetic resin, transversly breaking the connecting portions partially or totally in the covered network and bending the covered and broken network in the transverse direction to produce a channel-shaped trim.

3 Claims, 12 Drawing Figures

TRIM AND PRODUCING METHOD THEREOF

RELATED APPLICATION

Reference is made to a related copending U.S. application Ser. No. 53,551 [TFU-1], filed on June 29, 1979, and to the priority documents, Japanese Utility Model Application No. 98073/1978 and Japanese patent application No. 53618/1979, the contents of which are each incorporated hereinto by reference.

PREAMBLE

The present invention relates to a trim used for protecting, trimming and sealing edges, flanges, joints and the like of such things as automobiles, boats, furniture as well as for attaching weather stripping thereto.

The present invention also relates to a method for producing the trim described herein.

BACKGROUND OF THE PRESENT INVENTION

Trims of the above described type, where the structure comprises a core member embedded in a main body made of rubber or synthetic resin, have been conventionally used in order to obtain good shaped-retentivity. In such cases the trim is required to be flexible enough to be deformed in accordance with the contour of the portion or surface where it is to be attached. Therefore, the embedded core member must not obstruct the trim from readily and freely bending or twisting.

In order to satisfy this demand for flexibility, various types of core members have been used or proposed.

One such conventional trim is produced by forming a metal network, with a structure similar to a net, having connecting portions and spaces which are linearly disposed in its transverse and longitudinal directions, respectively. Such a network is thereafter covered with a covering material, such as rubber or synthetic resin. The covered metal network can then be bent into its desired cross-sectional shape such as the letter-U shape.

Such trim exhibits good flexibility in its longitudinal and torsional directions. However, since each of connecting portions of the metal network is made of metal, stiffness is introduced and sufficiently good flexibility cannot be obtained by this type of conventional trim.

Therefore, the above described conventional trim cannot be attached to a corner, flange or a surface having a large curvature.

It has also been found that by making the whole of the metal network serving as a core member thin, the flexibility thereof can be improved to a certain extent. However, the clamping force for clamping an edge flange or the like for such a trim is decreased and furthermore, during the step of covering the metal network with the covering material, such as rubber or synthetic resin, the metal network can elongate undesirably and can render the resulting product unusable for intended purposes.

Accordingly, an object of the present invention is to provide an improved trim having good flexibility and shape-retentivity.

Another object of the present invention is to provide a practical trim which can be easily attached along an edge or a flange, or along an edge surface and the like included as structures on automobiles or furniture.

Still another object of the present invention is to provide an improved trim which exhibits a good appearance that is maintained good through processing and use and that remains free of wrinkles, even when attached to a curved portion having a large curvature.

A further object of the present invention is to provide an improved trim having a stable and strong clamping force.

A still further object of the present invention is to provide an improved method for easily producing such an improved trim with good production efficiency.

BRIEF DESCRIPTION OF THE DRAWINGS

These and other objects and advantages of the present invention will become more fully understood when the following detailed description of the preferred embodiments is studied with reference to the accompanying drawings wherein.

DETAILED DESCRIPTION OF THE PREFERRED EMBODIMENTS OF THE PRESENT INVENTION

The present invention provides a trim including a core member made of a metal network in which connecting portions are partially and totally broken in a transverse direction and separated from each other in a longitudinal direction. The present invention also concerns a method for producing such a trim.

The connecting portions of the metal network are broken by applying both a tension force in the longitudinal direction of the trim and a bending force in the transverse direction thereof after the metal network has been covered with its covering material, such as, for example, rubber or synthetic resin.

According to the present invention the trim can be freely curved at the broken connecting portions of the core member so that the flexibility of the trim is greatly improved as compared with that of conventional trims where the core member is continuously connected like a net.

It should be noted that the metal network comprising the core member of the trim made according to the present invention has many wave like shapes including many alternating raised and depressed portions. Thus, the core member does not slip relative to the covering material even when the trim is attached along a corner having a large curvature. Accordingly, the trim of the present invention exhibits excellent shape-retentivity.

Turning to FIGS. 1–5, the expanded sheet of metal $A_2$ includes a plurality of spaces 2 and connecting portions 3, which are at this stage of manufacture disposed like a net and serve to hold the sheet together. A plurality of spaces 2 having a lozenge or diamond shape are linearly disposed in the transverse direction of the expanded sheet $A_2$ and a plurality of connecting portions 3 are also linearly disposed in the transverse direction thereof.

Figure 2:
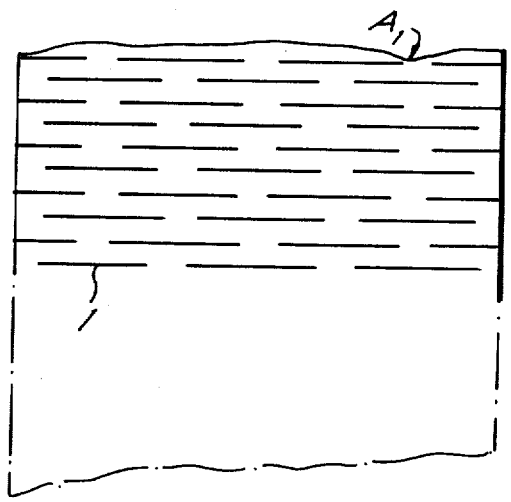
FIG. 2 is a top plan view of a band-shaped sheet of metal for forming the expanded sheet of metal shown in FIG. 1.

The expanded sheet $A_2$ can be obtained from a band-shaped sheet $A_1$ shown in FIG. 2. Such a sheet has been perforated with a plurality of transversely extending slits 1 each having a predetermined length across the band-shaped sheet $A_1$, linearly, in its transverse direction, at spaced intervals, and also alternately along its longitudinal direction at approximately the same spaced intervals.

Figure 1:
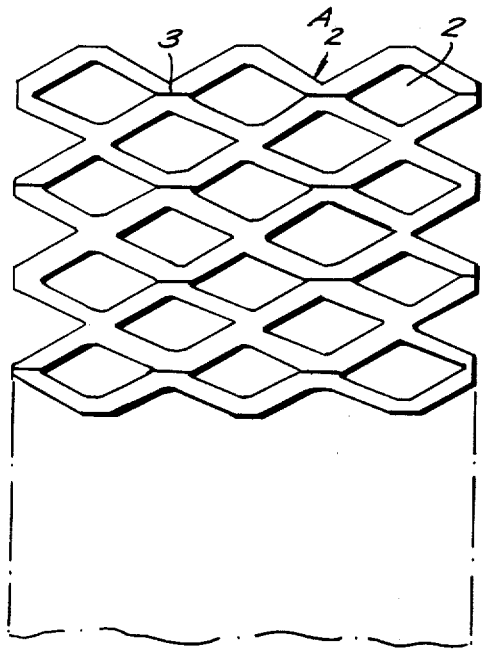
FIG. 1 is a top plan view of a first embodiment of an expanded sheet of metal prior to being embedded within covering material.

The expanded products shown in FIG. 1 results from applying a tension force in the longitudinal direction of the band-shaped sheet. As a result, each slit 1 is opened in the longitudinal direction to form a diamond shaped space 2 as shown in FIG. 1. At this stage, connecting portions 3 are inclined so that the expanded sheet of metal becomes uneven. However, by pressing the expanded sheet of metal, as for example by passing the expanded sheet between rollers, a flat expanded sheet of metal, as shown at $A_2$ in FIG. 1, can be obtained.

The expanded sheet of metal $A_2$ can be obtained by other well known means other than the above described method such as by punching.

In the expanded sheet shown at $A_2$, the connecting portions alternate between four to three connecting portions from row to row along its length in its longitudinal direction. Such an alternating construction is important as will be more fully explained hereinafter.

Next, the expanded sheet $A_2$ is covered with a covering material, such as for example, rubber or synthetic resin, by a well known extrusion forming process to form a first half-finished trim $B_1$. As was indicated previously, when rubber is used as the covering material, the covered sheet is further subjected to a vulcanization treatment.

Figure 3:
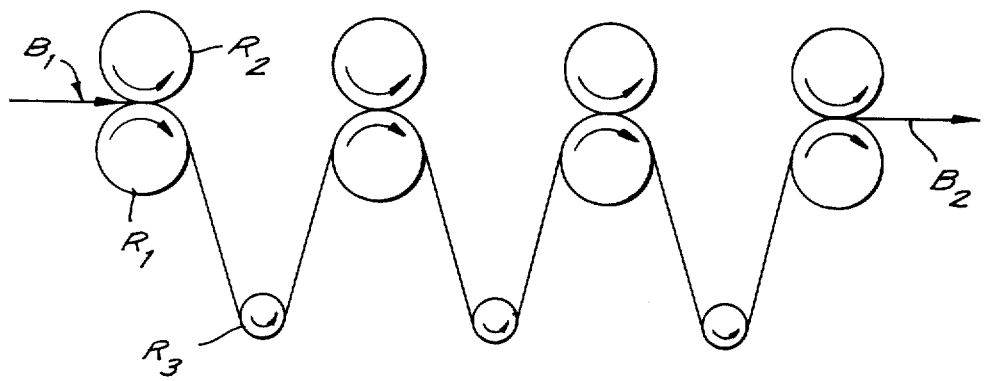
FIG. 3 diagrammatically shows the step of breaking the expanded sheet metal embedded within the covering material.

Then, as shown in FIG. 3, trim $B_1$ including sheet $A_2$ passes between rollers $B_1$ and $R_2$ each of which has a relatively large diameter, and around a roller $R_3$ having a relatively smaller diameter.

When trim $B_1$ passes around rollers $R_3$, a large bending stress is repeatedly applied to trim $B_1$ in a direction perpendicular to the longitudinal direction thereof. And by making the rotating speed of a pair of the rollers $R_1$ and $R_2$, positioned downstream in the proceeding direction of trim $B_1$, higher than that of a preceeding pair of rollers, a tension force is applied to trim $B_1$ in the longitudinal direction.

Figure 4:
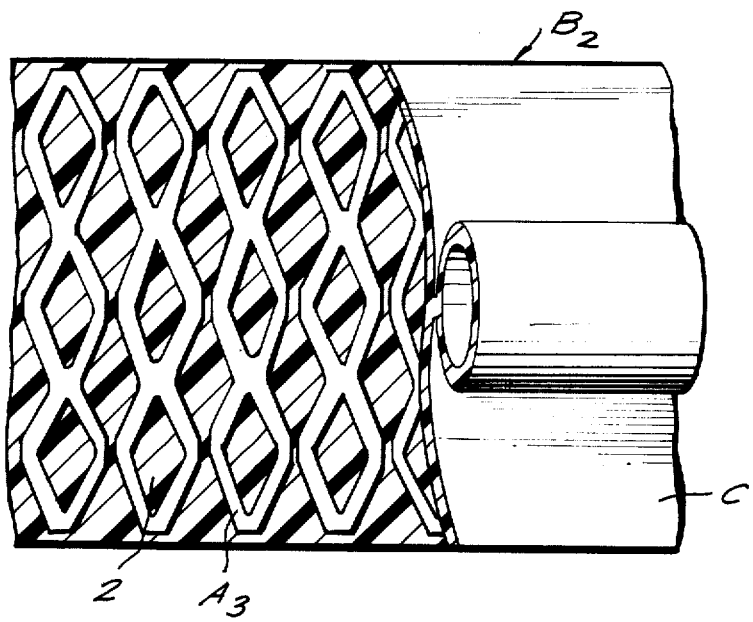
FIG. 4 is a top plan view, with portions of the covering material having been cut away for clarity, showing the half-finished trim of a first embodiment of the present invention.

The combined effect of the bending stress and the tension force concentrates upon the connecting portions positioned in those rows having a smaller number of connecting portions so that only the connecting portions in such relatively weaker rows are broken transversely to form a plurality of metal strip blocks $A_3$, as shown in FIG. 4, each having four transversely disposed connecting portions and three diamond shaped spaces.

As a result, a long strip of trim $B_2$ is formed which includes a plurality of the separated metal strip blocks $A_3$ embedded within the covering member C along the entire length thereof.

Figure 5:
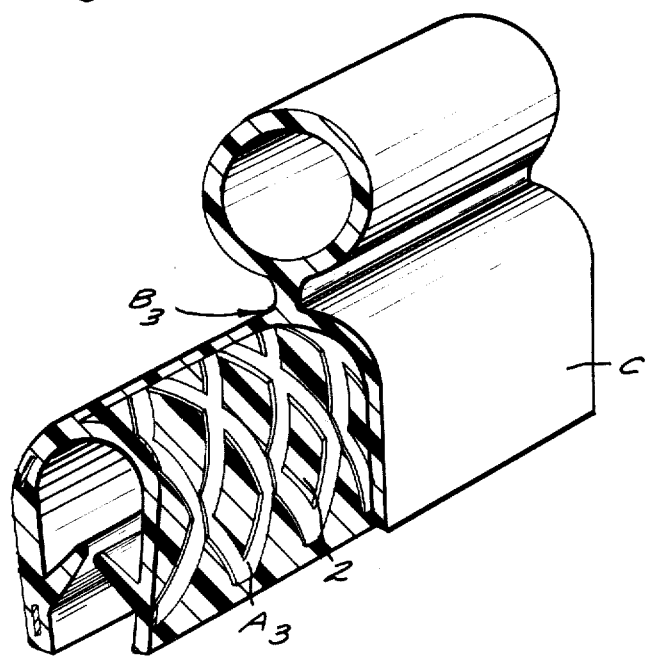
FIG. 5 is a perspective view of the first embodiment of the present invention that has been bent into a U-shaped form, with portions of the covering material having been cut away for clarity.

Next, by bending the trim $B_2$ into a desired cross sectional shape, such as letter-U shape as shown in FIG. 5, a finished trim, $B_3$, according to the present invention can be obtained. Each of separate metal strip blocks $A_3$ in trim $B_3$ is firmly fixed within the covering member by rubber or synthetic resin which flows into and extends through the spaces 2 and around each of metal strip blocks $A_3$. This also helps assure that the blocks $A_3$ do not slip relative to the covering C when the trim is curved or bent to conform to the surface on which it is being mounted.

According to the present invention, since each of metal strip blocks $A_3$ is embedded separately, the trim is easily curved in the broken portions to exhibit good flexibility.

Therefore, the trim of the present invention can be easily attached to a corner, or surface, having a large curvature and exhibits good shape-retentivity.

Furthermore, when the trim is attached to an edge or the like, its good appearance can be maintained without any uneveness or wrinkles appearing on the surface thereof.

Also, since the metal strip blocks $A_3$ can be easily formed by applying a bending stress to the expanded sheet metal $A_2$ as described above, production efficiency of the trims is very high.

Figure 6:
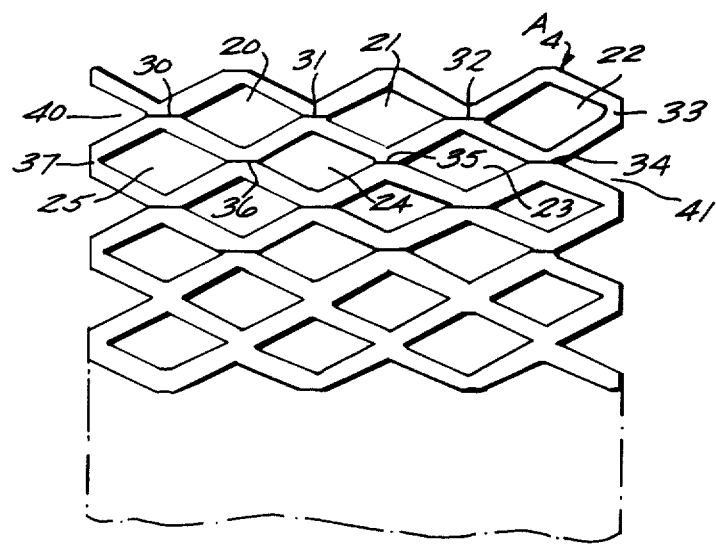
FIG. 6 is a top plan view of a second embodiment of an expanded sheet of metal prior to being embedded within a covering material.
Figure 7:
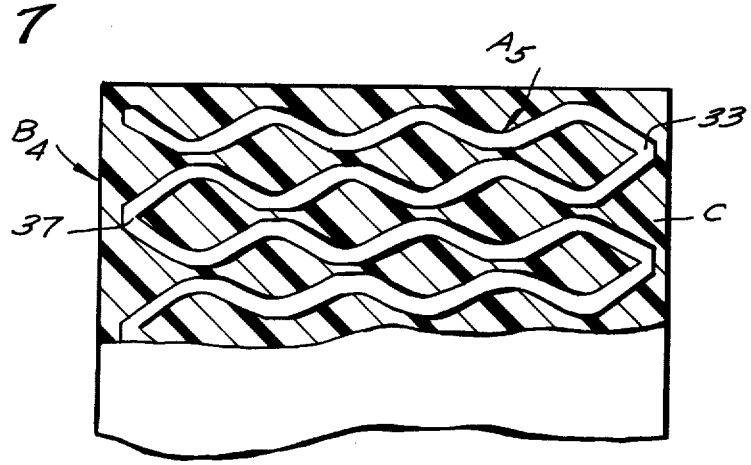
FIG. 7 is a top plan view of a half-finished trim from which a portion of the covering material has been cut away for clarity.
Figure 8:
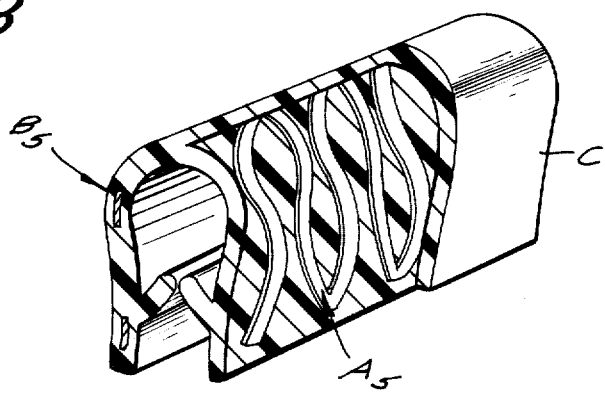
FIG. 8 is a perspective view of a trim according to the second embodiment from which a portion of the covering material has been cut away for clarity.

FIG. 6 to FIG. 8 show a second embodiment of the present invention.

An expanded sheet of metal $A_4$ (FIG. 6) to be embedded within a covering member is produced by providing a large number of transversely extending slits in a band-shaped sheet metal and expanding it in the longitudinal direction in a manner similar to that described above. However, the sheet $A_4$ could also be produced by a punching process.

In FIG. 6, the first transverse row of the obtained expanded sheet $A_4$ is composed of three spaces 20, 21 and 22, four connecting portions 30, 31, 32 and 33 and one open space 40. The second transverse row of the expanded sheet metal $A_4$ is composed of three spaces 23, 24 and 25, four connecting portions 34, 35, 36 and 37 and one open space 41. Open space 40, in the first transverse row, is positioned in one side edge of the sheet $A_4$ while open space 41 in the second transverse row is positioned in the other side edge of sheet $A_4$. A repeat of this pattern occurs in the following rows along the length of th expanded sheet $A_4$.

A half-finished trim ( not shown) including the above described expanded sheet $A_4$ is obtained by covering the sheet $A_4$ with a covering material, such as rubber or synthetic resin, again by means of a conventional extrusion forming process.

Next, the half-finished trim is passed between rollers in the same manner as that of the first embodiment and bending stress is applied to the trim in a direction perpendicular to the longitudinal direction thereof.

This bending stress concentrates upon connecting portions 30 and 34 which face open spaces 40 and 41 positioned on both side edges of the sheet A$_4$. As the bending stress is repeatedly applied, connecting portions of the first transverse row of the sheet metal A$_4$ are successively broken in a certain order of connecting portions starting with portion 30, then followed in turn by portions 31 and 32. The connecting portions of the second transverse row are also broken successively in a similar order beginning with connecting portion 34 and then by portions 35 and 36. By determining the value of the bending stress applied by each of the various rollers so that only the connecting portions 33 and 37 may remain without being broken, the sheet A$_4$ is formed into a wave-shaped linear metal strip A$_5$ which remains disposed within the covering member C in meandering shape as shown in FIG. 7.

As a result, trim B$_4$ including the metal strip A$_5$ embedded within the covering material C, is obtained. Thereafter, trim B$_4$ can be bent into any desired cross sectional shape so that a trim such as B$_5$ of the present invention, as shown in FIG. 8, is produced.

FIG. 9 to FIG. 12 show a third embodiment of the present invention. A sheet of metal A$_6$, to be used in the third embodiment, has spaces 2 of a lozenge or diamond shape positioned or arranged in a manner similar to the spaces in sheet A$_4$ of the second embodiment. In sheet A$_6$, spaces 2 and stepped portions 38 (FIG. 11) of all of the connecting portions 3 are formed at one time by a punching and pressing machine. The stepped portions 38 are made thin so that they are weakened portions and be easily broken.

Next, by embedding the sheet A$_6$ having the above described construction within a covering member, again of rubber or synthetic resin, half-finished trim (not shown) can be obtained.

Figure 10:
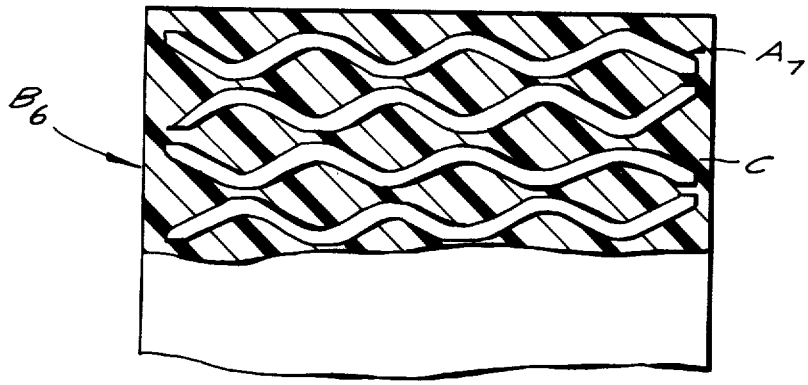
FIG. 10 is a top plan view of a half-finished trim from which a portion of the covering material has been cut away for clarity.
Figure 11:
FIG. 11 is a sectional view of a stepped portion of the band-shaped sheet of metal taken along the line XI—XI of FIG. 9.

Then, such a trim is passed through rollers as shown in FIG. 3, with the result that all of the connecting portions 3 of the sheet A$_6$ are broken producing a trim B$_6$ as shown in FIG. 10 wherein a plurality of wave-shaped metal strip pieces A$_7$ are disposed within the covering member C at predetermined intervals along its length.

Figure 12:
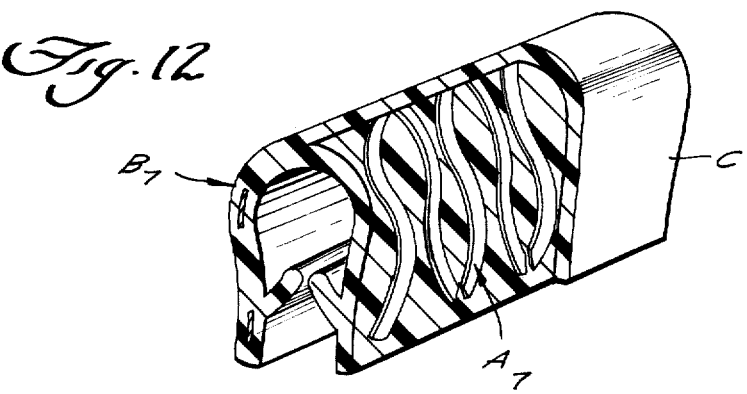
FIG. 12 is a perspective view of a trim according to the third embodiment of the present invention from which a portion of the covering material has been cut away for clarity.
Figure 9:
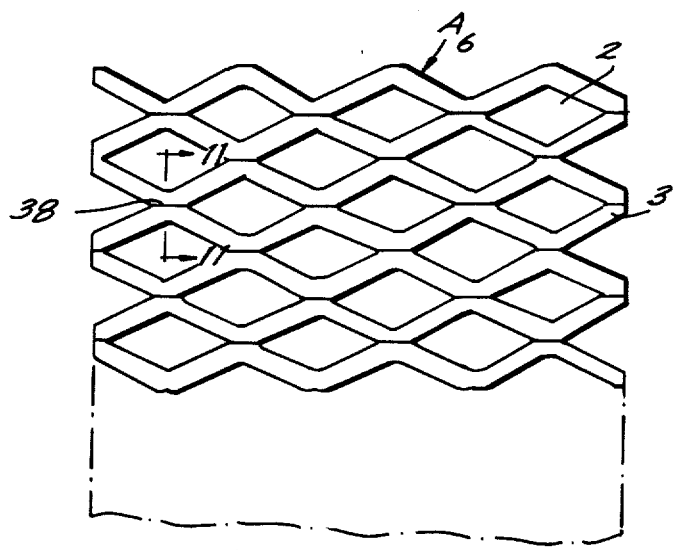
FIG. 9 is a top plan view of a third embodiment of a sheet of metal prior to being embedded within covering material.

Trim B$_6$ can be bent in any desired cross sectional shape, such as letter-U shape like each of the above described embodiments, so that a trim such as B$_7$ of the present invention, as shown in FIG. 12, is obtained.

In the trim produced according to the second embodiment, one metal strip is disposed within the covering material in a meandering line extending along the longitudinal direction of the trim.

In the trim produced according to the third embodiment, a large number of transversely extending metal strips are disposed along the longitudinal direction of the trim at predetermined intervals.

As described above, the metal strip of the second embodiment or the metal strip pieces of the third embodiment are spaced in the longitudinal direction of the trim, so that flexibility of the trims of the second and the third embodiments is very good. Therefore, they can be easily attached to corners or flanges having a large curvature.

Since the metal strip or metal strip pieces of the present invention are formed into wave like shapes, the metal strip or metal strip pieces are firmly fixed to the covering member. Therefore, even if the trim of the present invention is curved, the metal strip or metal strip pieces scarcely slip relative to the covering member. Thus, the trims of the present invention exhibit good shape-retentivity.

Further, since the metal strip or metal strip pieces are easily formed by applying bending stress to the expanded sheet metal embedded within the covering member, production efficiency is very good.

As described above, the trims of the present invention exhibit very good flexibility and shape-retentivity, and they can be easily produced.

Therefore, the trims of the present invention are quite practical as the trims for use in covering or applying moulding along flanges on automobiles and furniture, especially where trims need to be attached to edges or the like exhibiting complicated shapes or a large curvature.

Having now fully described the invention, it will be apparent to one of ordinary skill in the art that many changes and modifications can be made thereto without departing from the spirit or scope of the invention as set forth herein.

What is claimed is:

1. A method for producing a channel-shaped trim including a core member embedded within a covering material and having a longitudinally extending opening for embracing and clamping an edge flange of a support member comprising the steps of:

preparing a band-shaped metal network comprised of a deformable material by forming a plurality of connecting portions and a plurality of lozenge shaped spaces which are linearly disposed in rows in both the longitudinal and transverse directions of the trim, respectively, each space being disposed between adjacent connecting portions in both the longitudinal and transverse directions of the trim;

forming predetermined ones of the connecting portions as weakened portions which are easily broken by bending stresses applied in a direction perpendicular to the longitudinal direction of the network;

said weakened portions being comprised of all connecting portions which are disposed in every other transversely extending row;

covering the network with a covering material to form a covered network;

applying bending stress to the covered network in a direction perpendicular to the longitudinal direction thereof to break the weakened connection portions thereby separating the network at predetermined locations along the length thereof; and bending the covered network in the transverse direction to form a longitudinally extending channel-shaped opening in the trim and in the core member composed of the separated network embedded within the covering material.

2. The method for producing a channel-shaped trim according to claim 1, wherein:

said weakened portions are formed by reducing the number of connecting portions in every other transversely extending row by one from that of connecting portions in adjacent transversely extending rows while the number of connecting portions in the other transversely extending rows is the same as one another; and wherein during the breaking step, said weakened portions disposed in said transversely extending rows containing a smaller number of connecting portions are completely broken so that said network is broken into a plurality of wave shape strips composed of transversely disposed connecting portions and spaces.

3. The method for producing a channel-shaped trim according to claim 1, wherein:
said covering material is rubber or synthetic resin.

* * * * *